United States Patent
Shin et al.

(10) Patent No.: US 11,266,234 B2
(45) Date of Patent: Mar. 8, 2022

(54) SINK

(71) Applicant: LG Electronics Inc., Seoul (KR)

(72) Inventors: Mijoo Shin, Seoul (KR); Seonglak Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 360 days.

(21) Appl. No.: 16/559,163

(22) Filed: Sep. 3, 2019

(65) Prior Publication Data

US 2019/0387877 A1 Dec. 26, 2019

Related U.S. Application Data

(63) Continuation of application No. 15/879,889, filed on Jan. 25, 2018, now Pat. No. 10,441,076.

(30) Foreign Application Priority Data

Jan. 26, 2017 (KR) ........................ 10-2017-0012986

(51) Int. Cl.
*A47B 77/08* (2006.01)
*A47L 15/16* (2006.01)
(Continued)

(52) U.S. Cl.
CPC .......... *A47B 77/08* (2013.01); *A47L 15/0086* (2013.01); *A47L 15/16* (2013.01);
(Continued)

(58) Field of Classification Search
CPC ..... A47B 77/08; A47L 15/0086; A47L 15/16; E03C 1/01; Y02B 40/00
(Continued)

(56) References Cited

U.S. PATENT DOCUMENTS 3,961,984 A 6/1976 Torressen
4,420,005 A * 12/1983 Armstrong .......... A47L 15/0089
134/100.1
(Continued)

FOREIGN PATENT DOCUMENTS

EP 0425286 5/1991
GB 928929 6/1963
(Continued)

OTHER PUBLICATIONS

Extended European Search Report in European Application No. 18153390.2, dated Mar. 27, 2018, 8 pages.

*Primary Examiner* — Huyen D Le
(74) *Attorney, Agent, or Firm* — Fish & Richardson P.C.

(57) ABSTRACT

There is provided a sink including: a washing case that is divided into a plurality of spaces including a dishwashing space; a table on which the washing case is mounted; a dish rack that is detachably provided the dishwashing space and having a washing nozzle rotatably installed on a bottom; a sump assembly that is mounted on a bottom surface of the dishwashing space and stores washing water to be supplied to the washing nozzle in a state where the dish rack is mounted on the dishwashing space; and a washing cover that slides horizontally above the dishwashing space to be inserted into the table or to cover an opened upper surface of the dishwashing space, in which the washing cover includes an operation unit for inputting operating command for dishwashing and a display unit for displaying various information.

20 Claims, 8 Drawing Sheets

(51) Int. Cl.
*A47L 15/00* (2006.01)
*E03C 1/01* (2006.01)
*A47L 15/42* (2006.01)

(52) U.S. Cl.
CPC ............. *A47L 15/4227* (2013.01); *E03C 1/01* (2013.01); *Y02B 40/00* (2013.01)

(58) Field of Classification Search
USPC ............................................................ 4/638
See application file for complete search history.

(56) References Cited

U.S. PATENT DOCUMENTS

| | | |
|---|---|---|
| 4,739,781 A | 4/1988 | Casoli |
| 4,919,162 A * | 4/1990 | Lumby ............... A47L 15/0086 134/111 |
| 5,193,562 A * | 3/1993 | Rigby ................. A47L 15/0086 134/100.1 |
| 5,934,298 A * | 8/1999 | Singh ..................... E03C 1/184 134/85 |
| 5,988,193 A * | 11/1999 | Hernandez ........... A61C 19/002 134/184 |
| 10,441,076 B2 * | 10/2019 | Shin .................... A47L 15/0086 |
| 2003/0205246 A1 | 11/2003 | Christman et al. |
| 2010/0132111 A1 | 6/2010 | Na |
| 2016/0324391 A1 | 11/2016 | Lian et al. |
| 2016/0324393 A1 | 11/2016 | Xu et al. |

FOREIGN PATENT DOCUMENTS

| | | |
|---|---|---|
| JP | 2949170 | 9/1999 |
| JP | 2001275914 | 10/2001 |
| KR | 1020090053974 | 5/2009 |
| KR | 1020150031606 | 3/2015 |

\* cited by examiner

SINK

CROSS-REFERENCES RELATED APPLICATIONS

This application is a continuation of U.S. application Ser. No. 15/879,889, filed on Jan. 25, 2018, which claims priority under 35 U.S.C. § 119 to Korean Patent Application No. 10-2017-0012986 filed in Korea on Jan. 26, 2017. The disclosures of the prior applications are incorporated by reference in their entirety.

TECHNICAL FIELD

The present invention relates to a sink.

BACKGROUND

A sink is general defined as a kitchen appliance installed in a kitchen to wash dishware, fruits, or the like.

The general sink includes a water tank (or a washing case) for dishwashing, a drain pipe extending from a bottom of the water tank, and a water faucet for supplying washing water.

On the other hand, as disclosed in Korean Patent Laid-Open Publication No. 2015-0031606 (Mar. 25, 2015, hereinafter, related art 1) and Korean Patent Publication No. 2009-0053974 May 29, 2009, hereinafter, related art 2), a sink provided with a dishwashing function is disclosed.

However, the related arts 1 and 2 have the following problems.

First, there is a disadvantage that water consumption is large because the circulation of the washing water for dishwashing is impossible.

Second, there is a disadvantage that there is no means for collecting food waste generated in the dishwashing process and, in a case where the existing sink is used as it is, the user must collect and throw away the food waste directly by hand.

Third, since there is no means for supplying detergent for dishwashing, there is an inconvenience that the user must directly input detergent and rinse before washing.

Fourth, there is a disadvantage in that means for drying the washed dishes is not separately provided.

Fifth, there is a disadvantage that the utilization of the cover covering the dishwashing space is lowered.

SUMMARY

The present invention has been proposed in order to solve the problems described above.

In order to solve the problems described above, according to an embodiment of the present invention, there is provided a sink including: a washing case that is divided into a plurality of spaces including a dishwashing space; a table on which the washing case is mounted; a dish rack that is detachably provided in the dishwashing space and has a washing nozzle rotatably installed on a bottom; a sump assembly that is mounted on a bottom surface of the dishwashing space and stores washing water to be supplied to the washing nozzle in a state where the dish rack is mounted on the dishwashing space; and a washing cover that slides horizontally above the dishwashing space to be inserted into the table or to cover an opened upper surface of the dishwashing space, in which the washing cover includes an operation unit for inputting operating command for dishwashing and a display unit for displaying various information.

The sink according to the embodiment of the present invention having the configurations described above has the following effects.

First, since the dish rack can be attached to and detached from the sink, there is an advantage that it can be used as a general sink when the dishwashing function is not used.

Second, since the washing water for dishwashing is circulated in the sump, the consumption of washing water is remarkably reduced.

Third, since the function of drying the dishes is provided, there is an advantage that the bacteria can be prevented from flourishing on surfaces of the dishes.

Fourth, since the food waste generated in the dishwashing process is collected to the food processing device through the drain pipe after the completion of the dishwashing, there is an advantage that the user does not have to touch the food waste directly by hand.

Fifth, since the washing cover covering the dishwashing space functions as a display unit, there is an advantage that the washing cover is highly utilized and since the washing cover can slide into the inside of the sink cover, there is an advantage of no risk of breakage of the washing cover and inconvenience of storage.

DESCRIPTION OF EMBODIMENTS

Hereinafter, a sink having a dishwashing function according to an embodiment of the resent invention will be described in detail with reference to the drawings.

Figure 1:
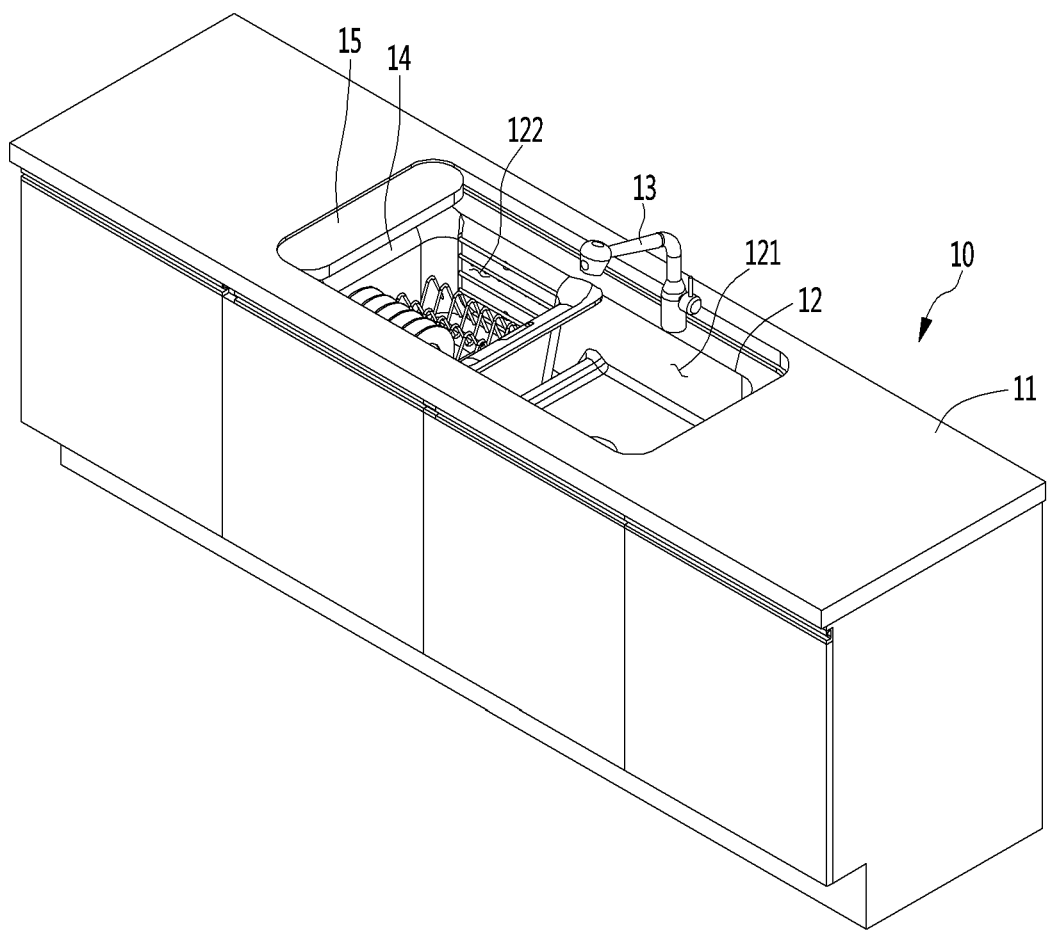
FIG. 1 is a front perspective view of a sink illustrating a state where a dishwashing space is opened.
Figure 3:
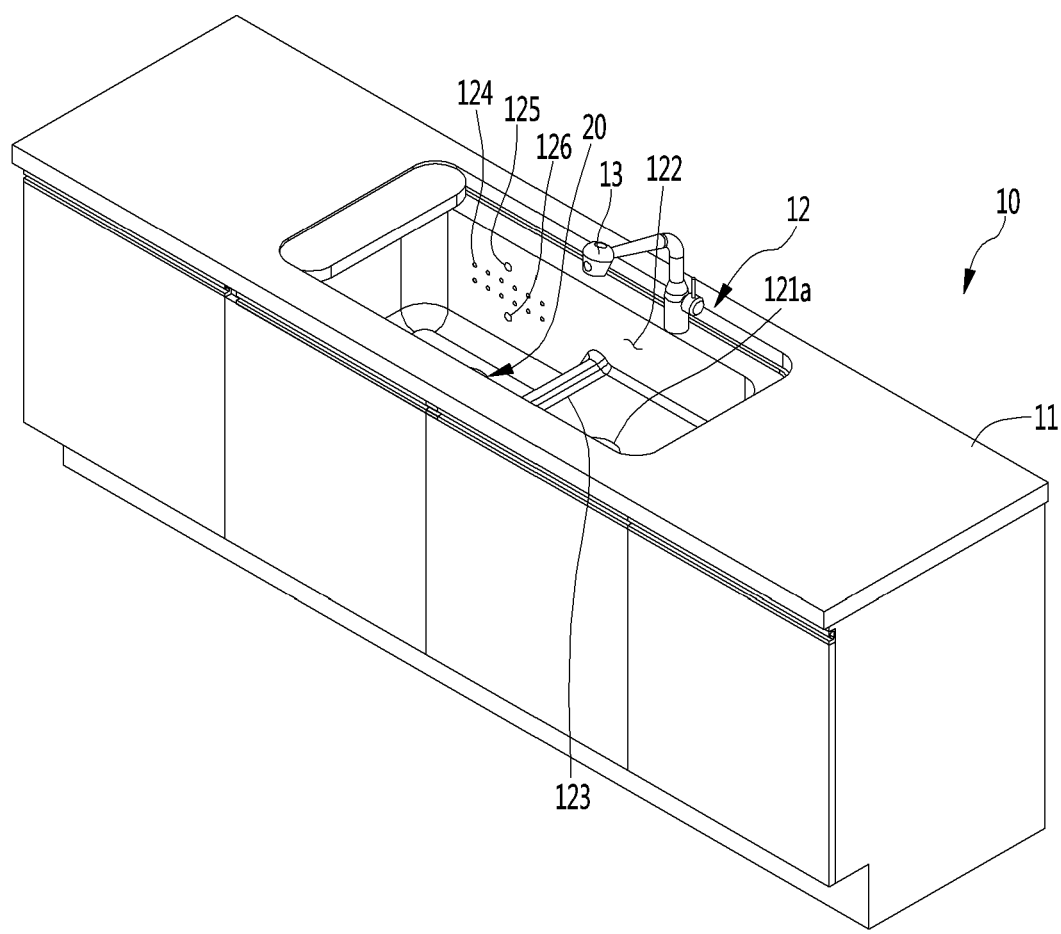
FIG. 3 is a front perspective view of the sink illustrating a state where the dish rack is detached from the sink.

FIG. 1 is a front perspective view of a sink illustrating a state where a dishwashing space opened, is a front perspective view of the sink illustrating a state where the dishwashing space is closed, and FIG. 3 is a front perspective view of the sink illustrating a state where the dish rack is detached from the sink.

Figure 2:
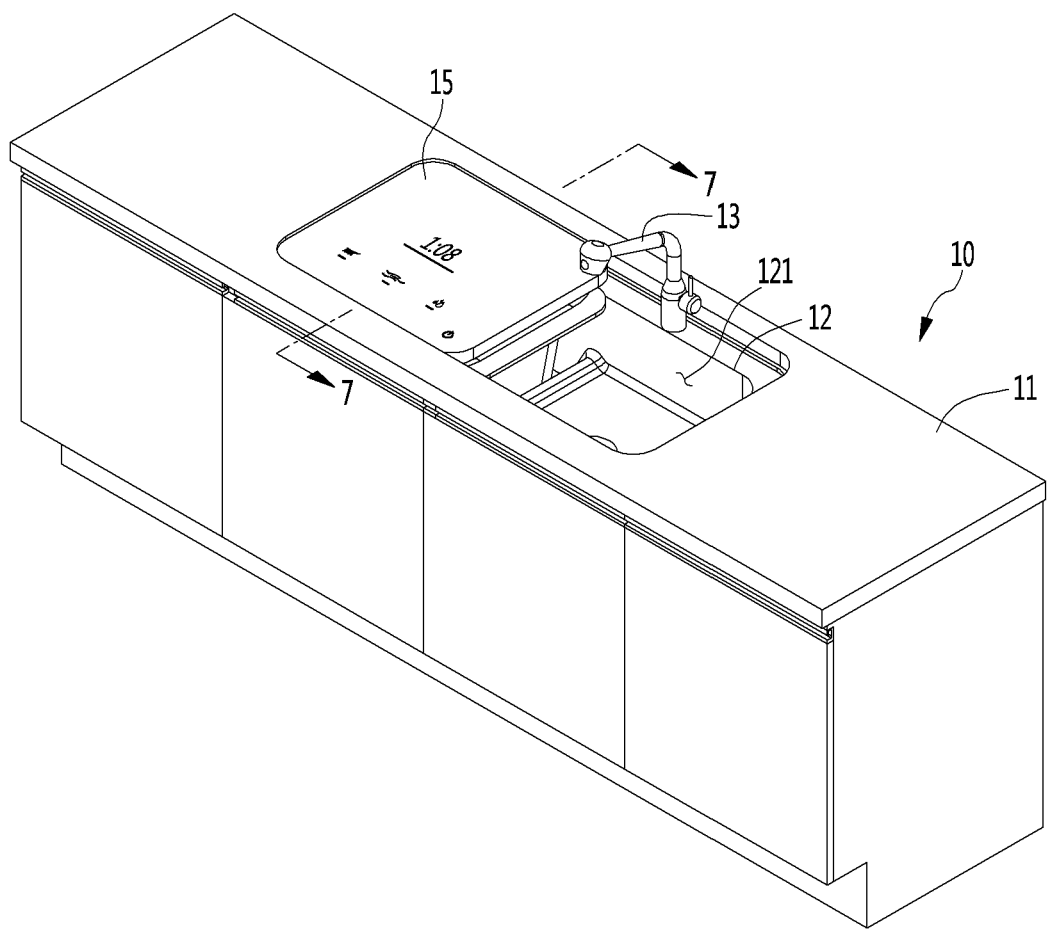
FIG. 2 is a front perspective view of the sink illustrating a state where the dishwashing space is closed.

With reference to FIG. 1 to FIG. 3 the sink 10 according to the embodiment of the present invention includes a table 11 on which a hole is formed, a washing case 12 that is mounted on the hole, and a water tap 13 which is provided at a rear end of the washing case 12.

Specifically, an inner portion of the washing case 12 may be divided into a first washing space 121 and a second washing space 122 by a division wall 123. The division wall 123 connects the front surface and the rear surface of the washing case 12 so that the first washing space 121 and the second washing space 122 can be separated from each other in the left and right directions. The height of the division wall 123 may be equal to or smaller than an inner depth of the washing case 12.

In addition, one of the first washing space 121 and the second washing space 122 may be used as a space for automatic dishwashing and the water tap 13 may be disposed at the rear end of the other thereof. Accordingly, the user can perform manual washing or fruit washing using the other washing space in a state where the automatic dishwashing function is performed in either the first washing space 121 or the second washing space 122.

In other words, an upper surface of the space used as the automatic dishwashing space may be selectively shielded by the washing cover 15, among the first washing space 121 and the second washing space 122.

In addition, the dish rack 14 can be detachably accommodated in a space used as the automatic dishwashing space among the first washing space 121 and the second washing space 122. A depth of the space used as the automatic dishwashing space can be made deeper than the depth of the other space so that the dish rack can be accommodated.

Specifically, the washing cover 15 slides and covers the opened upper surface of the automatic dishwashing space. The washing cover can be slid downward the table 11. More specifically, the washing cover 15 can be slid in the lateral direction at the left edge or the right, edge of the washing case 12 to be shielded by the upper surface of the table 11, and any one of the first washing space 121 and the second washing space 122 may be opened.

The washing cover 15 may be designed to be movable in the left and right directions by driving motor (not illustrated) and a button for inputting a moving command of the washing cover 15 may be provided in one side of the table 11. Of course, the washing cover 15 may be manually moved by a user.

Alternatively, as illustrated in FIG. 1, in a case where the washing cover 15 is provided at the left edge of the washing case in a state where the washing cover 15 is completely drawn to the lower side of the table 11, a portion of the right edge of the washing cover 15 can be exposed without being completely drawn into the table 11. An input button for inputting a moving command of the washing cover 15 may be provided on the upper surface of the exposed washing cover 15 in a form of touch button.

The washing cover 15 covers the upper surface of the automatic dishwashing space during the washing process to prevent the washing water from scattering to the outside. The upper surface of the washing cover 15 may be provided with display unit and a control panel function, which will be described below with reference to the drawings.

On the other hand, for example, when the automatic dishwashing space is formed in the second washing space 122, a drain port 121a is formed on a bottom of the first washing space 121, drain port is also formed on a bottom of the second washing space 122, and a sump assembly 20 is mounted on a drain port of the second washing space 122.

In addition, a washing water supply hole 125 and a detergent supply hole 126 may be formed on the rear surface of a space to accommodate the dish rack 14, that is, the rear surface of the second washing space 122 defining the automatic dishwashing space, among the rear surface of the washing case 12.

Specifically, the washing water supply hole 125 may be a single hole to which only cold water is supplied or a pair of holes to which cold water and hot water are respectively supplied. The pair of holes may be spaced apart in the left and right directions.

In addition, the rear surface of the second washing space 122 defining the automatic dishwashing space may include a plurality of air holes 124 through which hot air for drying the dishes is supplied.

Figure 4:
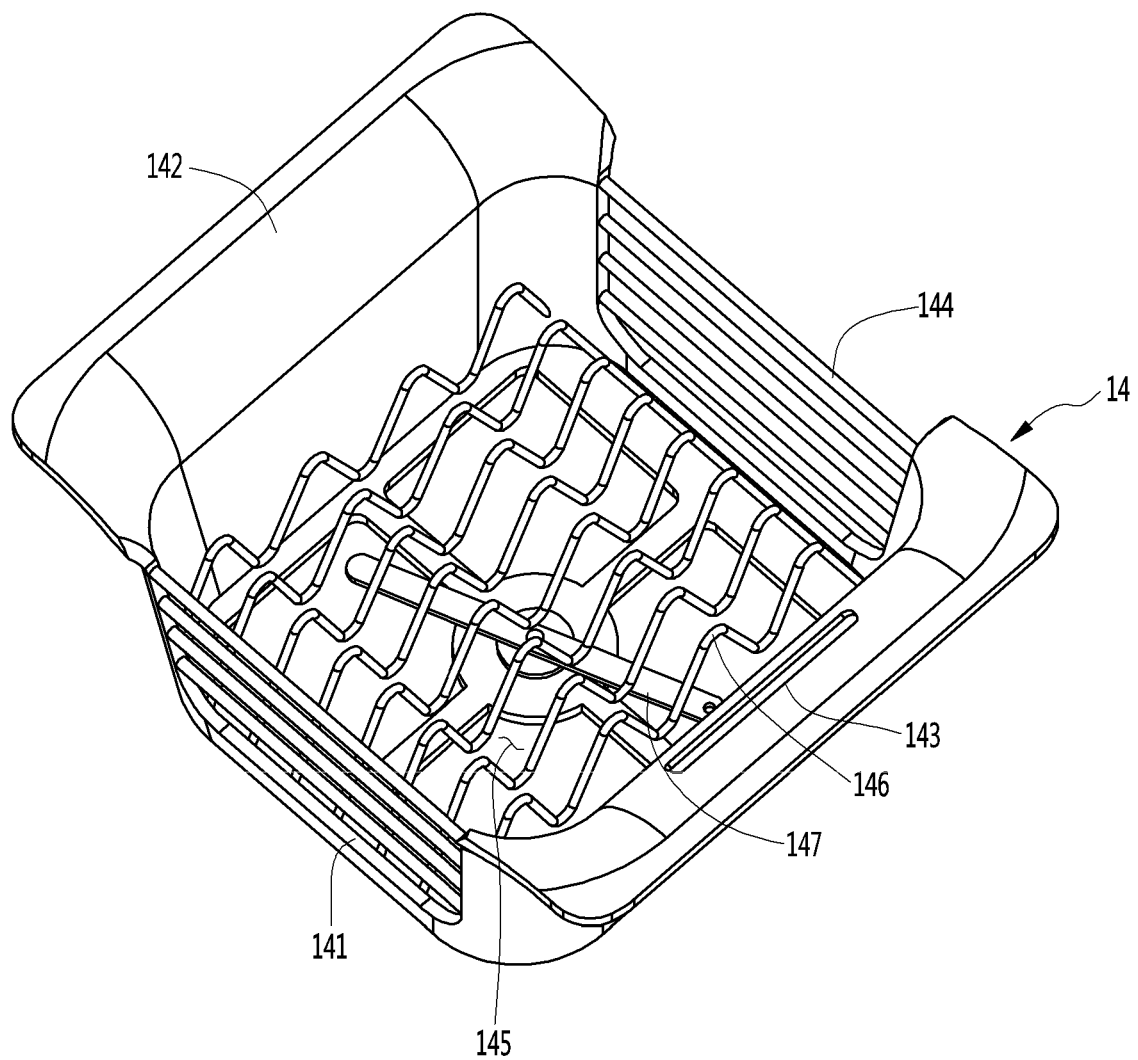
FIG. 4 is a perspective view of the dish rack provided in the sink according to an embodiment of the present invention.

FIG. 4 is a perspective view of a dish rack provided in the sink according to an embodiment of the present invention.

With reference to FIG. 4, the dish rack 14 detachably provided in the automatic dishwashing space of the present invention may include a bottom portion, a front portion, a rear portion, a left side portion, and a right side portion and the upper surface may be an opened surface.

Specifically, the rear surface of the dish rack 14 can be opened so that the high-temperature dry air in through the air holes 124 formed in the rear surface of the washing case 12 is supplied into the dish rack 14 to dry the dishes.

More specifically, a portion of the rear surface of the dish rack 14 may be cut into a predetermined width and depth, and a plurality of guide wires 144 may be mounted on the cut portion. The plurality of guide wires 144 may extend in the transverse direction, and both ends thereof may be fixed to the left and right edges of the cut portion. The plurality of guide wires 144 may be spaced apart from each other by a predetermined distance in the vertical direction.

In addition, the front portion of the dish rack 14 may be cut in the same manner as the rear portion and a plurality of guide wires 146 may be mounted on the cut portion, but the present invention is not limited thereto.

The left side portion and the right side portion of the dish rack 14 may extend by a predetermined height from the bottom portion and the flange 142 may extend in the lateral direction at the upper-end portion. The flange 142 is formed to be bent at the upper end of the left side portion and the right side portion so that the flange 142 can function as a handle that the user can grasp by hand. In other words, the user can hold the flange 142 with both hands and move the dish rack 14.

In addition, an air slit 143 may be formed at a corner portion where the side portion of the dish rack 14 meets the flange 142. Specifically, the air slit 143 may be formed on a portion of the flange 142 adjacent to the division wall 123 of the washing case 12. Further, a plurality of air slits 143 or air holes may be formed on the side portion adjacent to the division wall 123. Then, in the process of drying the dishes, the dry wind supplied to the dish rack 14 is discharged through the air slit 143 or the air holes after coming in contact with the dishes. In addition, the discharged air can be discharged to the side washing space over the division wall 123.

On the other hand, a washing nozzle 147 can be rotatably mounted on a center of the bottom portion of the dish rack 14. A plurality of drain holes 145 may be formed in the bottom of the dish rack 14. A plurality of jetting holes 147a and 147b (see FIG. 7) are formed on the upper surface of the washing nozzle 147.

In a state where one end portion and the other end portion of the washing nozzle 147 face the left side and the right side of the washing case 12, a plurality of injection holes 147a arranged toward one end portion of the washing nozzle 147 may be formed to be inclined toward the rear surface (or the front surface) of the washing case 12 based on the center of the washing nozzle 147.

In contrast, the plurality of injection holes 147b arranged toward the other end portion of the washing nozzle 147 may be formed to be inclined toward the front surface (or rear surface) of the washing case 12.

Specifically, the plurality of injection holes 147a may be defined as first injection holes, the plurality of injection holes 147b may be defined as second injection holes, and the opening direction of the first injection hole and the opening direction of the second injection hole may be formed so as to be opposite to each other.

The washing nozzle 147 can rotate clockwise or counterclockwise without a separate power source due to the injection pressure of the washing water injected from the plurality of injection holes 147a and 147b.

More specifically, some of the plurality injection holes 147a and 147b are formed at an angle as described above, and the remaining portion of the injection holes 147a and 147b is formed so as to face the upright side, so that the dishes accommodated in the dish rack 14 can be washed by the washing water injected at a high-pressure.

An other words, a support wire 141 may be provided in the dish rack 14 so as to accommodate dishware such as dishes. The shape and the disposition manner of the support wire 141 are not particularly limited.

Figure 5:
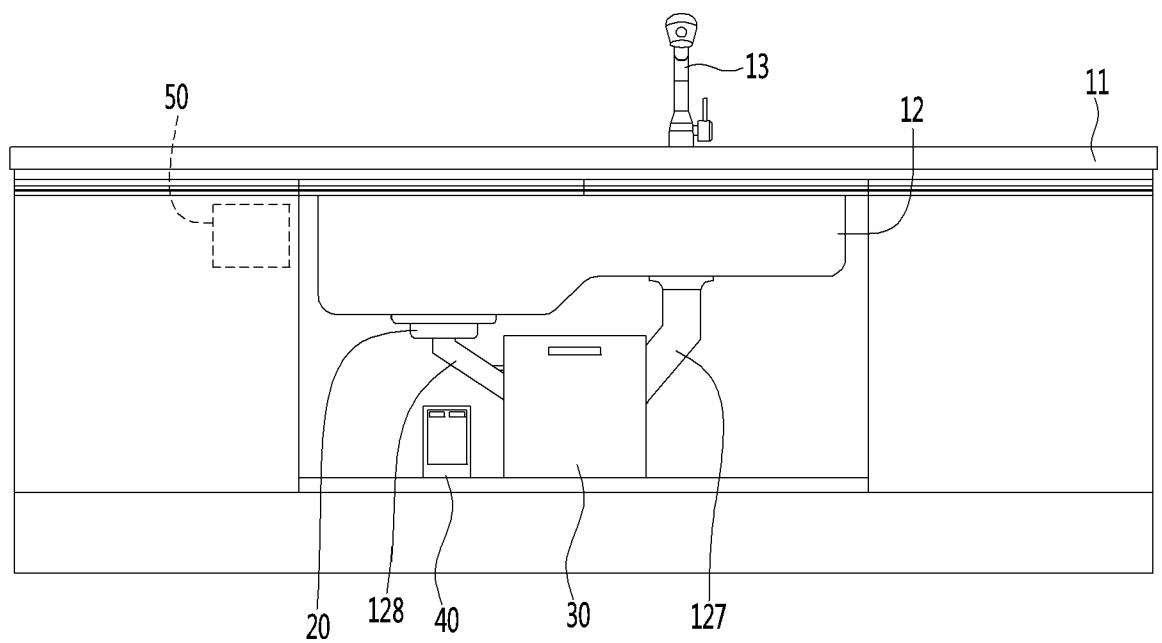
FIG. 5 is a view illustrating a state where a front surface of the sink is opened according to an embodiment of the present invention.

FIG. 5 is a view illustrating a state where a front surface of the sink is opened according to an embodiment of the present invention.

With reference to FIG. 5, a sink door (not illustrated) may be provided on the front surface of the sink 10 according to an embodiment of the present invention, which slides in the left and right directions or rotates in the front and rear directions. When the sink door is opened, the internal configuration of the sink 10 can be exposed to the outside.

Specifically, the bottom portion of the washing case 12 can be formed so that the bottom of the washing space used as the automatic dishwashing space is lower than the bottom of the other space, as illustrated in FIG. 5.

The sump assembly 20 may be mounted on the bottom of a washing space (second washing space in this embodiment) used as an automatic dishwashing space. The first drain pipe 127 and the second drain pipe 128 may be connected to the bottom of the first washing space 121 and the bottom of the sump assembly 20, respectively. In other words, an inlet end of the first drain pipe 127 may be connected to the first drain port 121a and an inlet end of the second drain pipe 128 may be connected to the sump assembly 20.

In addition, a food processing unit 30 may be installed in the sink 11, and an outlet end of the first drain pipe 127 and an outlet end of the second drain pipe 128 may be connected to the food processing unit. Therefore, the food waste generated in the first and second washing spaces 121 and 122 flows along with the washing water to the food processing unit 30 along the drain pipes 127 and 128. The food waste moved to the food processing unit 30 remains therein, and the washing water is connected to a drain pipe (not illustrated) installed on the indoor bottom, and drained to the outdoor drain pipe. With this structure, there is an advantage that the user is not required to pick up the food waste generated by the dishwashing process by hand and to load the food waste into a standard plastic garbage bag.

In addition, a detergent supply unit 40 containing dishwashing detergent and rinse may be disposed in the sink 10. When the dishwashing command is input, the detergent supply unit 40 automatically supplies detergent and rinse to the washing space for the automatic dishwashing, that is, the second washing space 122.

On the other hand, a control box 50 including a main controller may be installed on a side of an inner portion of the sink 10 corresponding to the lower side of the table 11. Accordingly, the performing of the automatic box washing mode and the control thereof according to this can be performed by the control box 50. Of course, the supply of detergent and rinsing performed in the detergent supply unit 40 will also be controlled by the main controller. Further, the function of the food processing unit 30 itself may be automatically controlled by the main controller provided in the control box 50.

Figure 6:
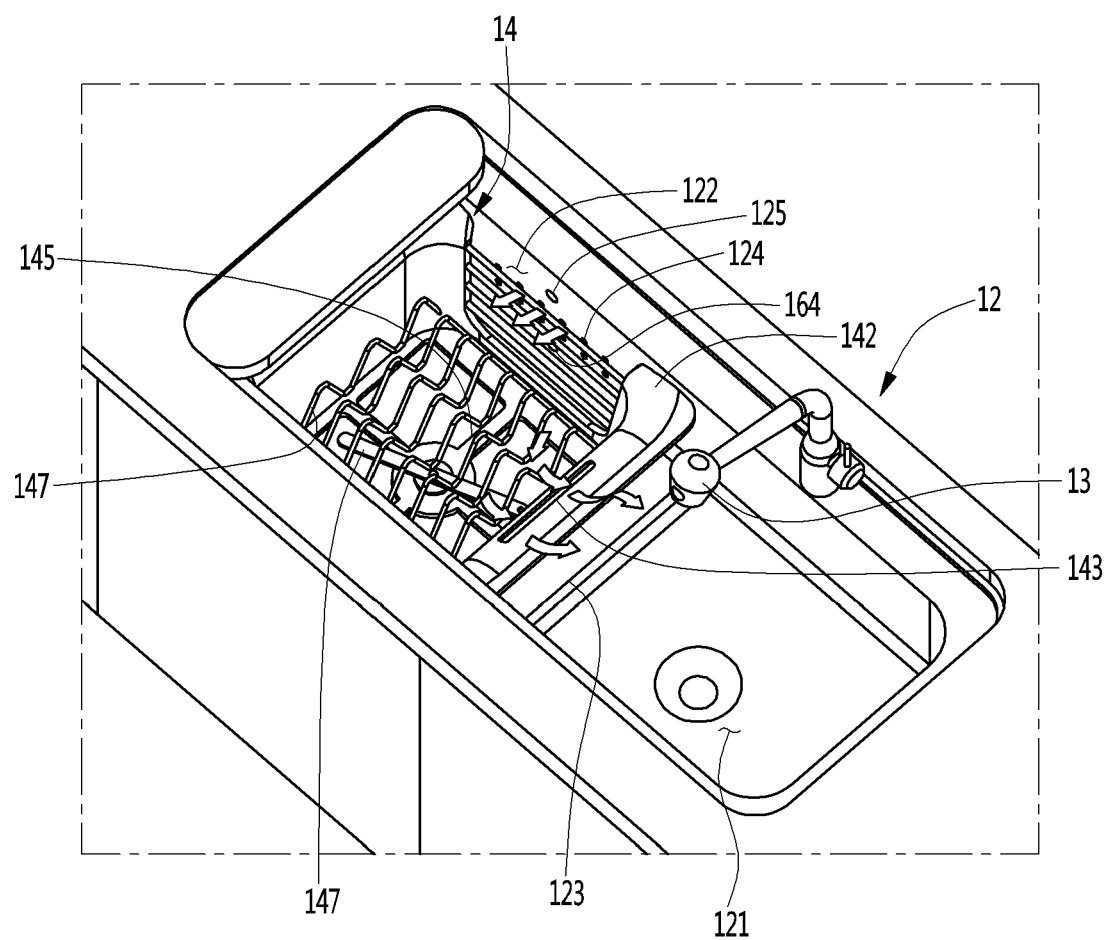
FIG. 6 is a view illustrating a flow of a drying wind that is generated in a dish drying process after completion of washing.

FIG. 6 is a view illustrating a flow of a drying wind that is generated in a dish drying process after completion of washing.

Referring to FIG. 6, first, for example, a case where the second washing space 122 is used as an automatic dishwashing space will be described.

Specifically, when the dishwashing step is completed, a drying step may be performed in which a high-temperature drying wind is supplied to the second washing space 122 to dry the dishes. In the drying step, heated and dried air through the plurality of air holes 124 flows into the second washing space 122. The drying air flowing into the second washing space 122 is guided into the dish rack 14 through the rear surface of the dish rack 14.

The dry air introduced into the dish rack 14 is brought into contact with the surface of the dishes and evaporates the moisture remaining on the surface of the dishes to change into a humid state. Humid air is discharged to the outside of the dish rack 14 through the drain hole 145 formed in the bottom of the dish rack 14 and the air hole or air slit 143 formed in the side surface of the dish rack 14.

The humid air discharged to the outside of the dish rack 14 rides on the division wall 123 and is discharged toward the first dishwashing space 121. The division wall 123 is inclined obliquely as the cross-sectional area becomes narrower toward the upper end so that the humid air can be smoothly discharged from the second washing space 122.

In addition, an upper-end portion of the division wall 123 is formed lower than an upper end of the washing case 12 so that even in a state where the washing cover 15 covers the second washing space 122, the humid air can be smoothly discharged from the second washing space 122.

Figure 7:
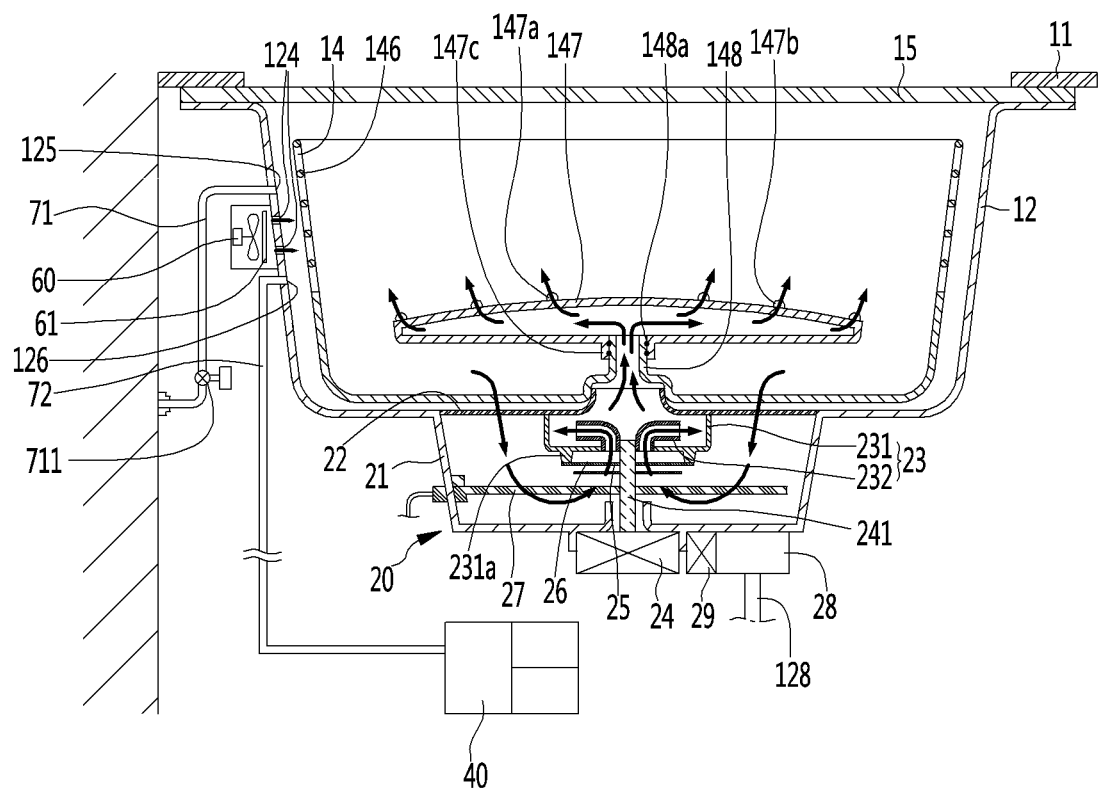
FIG. 7 is longitudinal sectional view taken along line 7-7 of FIG. 2.

FIG. 7 is a longitudinal sectional view taken along line 7-7 of FIG. 2.

With reference to FIG. 7, for automatic dishwashing, the upper surface of the second washing space 122 is shielded by the washing cover 15.

Specifically, a washing water supply pipe 71 is connected to the rear surface of the washing case 12 defining the rear surface of the second washing space 122. The washing water supply pipe 71 may include at least one or both of a cold drain pipe and a hot drain pipe. The washing water supply pipe 71 is a pipe connected to the rear surface of the second washing space 122 for automatic dishwashing. In other words, the drain pipe connected to the drain pipe 13 is provided separately.

The washing water supply pipe 71 may include an opening/closing valve 711. The opening and closing time and the opening and closing time interval of the opening and closing valve 711 can be controlled by the main controller provided in the control box 50 in a state of the automatic dishwasher mode. The outlet end of the washing water supply pipe 71 is connected to the washing water supply hole 125 formed in the rear surface of the second washing space 122.

In addition, a drying fan 60 may be mounted on the outer rear surface of the second washing space 122 and a drying heater 61 may be mounted on the front or rear of the drying fan 60. The drying fan 60 and the drying heater 61 may be mounted on the rear surface of the washing case 12 in a form of a single module. The plurality of air holes 124 are mounted on the formed rear surface of the washing case and thus the heated and dried air supplied by the drying fan 60 can be supplied into the second washing space 122.

In addition, a detergent supply pipe 72 may be connected to the detergent supply hole 126 formed in the rear surface of the second washing space 122. The detergent supply pipe 72 extends from the detergent supply unit 40 in which the detergent and rinse are stored and an inside portion of the detergent supply unit 40 may be divided into a detergent storage space and a rinse storage space. A detergent supply pump for supplying detergent and rinse may be mounted on one side of the detergent supply unit 40.

Accordingly, when the dishwashing mode is executed, the detergent supply pump operates and then the detergent and rinse can be supplied into the second washing space 122 through the detergent supply pipe 72.

Here, the detergent supply pipe 72 may be a single pipe, and a detergent supply pipe and a rinse supply pipe may be separately provided. In this case, a detergent supply pump and a rinse supply pump may be separately provided.

In other words, a nozzle holder 143 protrudes in a form of a sleeve on a center of the bottom portion of the dish rack 14 and the washing nozzle 147 can be rotatably mounted on the outer peripheral surface of the nozzle holder 148.

Specifically, a cylindrical nozzle sleeve 147c fitted to the outer peripheral surface of the nozzle holder 148 may be formed to be extended at the center of the bottom portion of the washing nozzle 147. A bearing 148a is mounted on a portion where the inner peripheral surface of the nozzle sleeve 147c is in contact with the outer peripheral surface of the nozzle holder 148 to allow the washing nozzle 147 to be capable of rotating smoothly.

In addition, the sump assembly 20 is mounted on the bottom portion of the second washing space 122. The structure and function of the sump assembly 20 will be described below.

Specifically, the sump assembly 20 may include a sump housing 21 in which washing water collects and a sump cover 22 which covers an upper surface of the sump housing 21. The sump housing 21 is mounted to a drain port formed at the bottom portion of the washing case 12 defining the second washing space 122.

In other words, a flange portion that is bent in the radial direction of the sump housing 21 is formed on the upper surface edge of the sump housing 21 and the flange portion may be mounted on the washing case 12 in a state of being hooked on the edge of the drain port. Of course, a sealing structure is provided for preventing leakage of water at a portion where the flange portion of the sump housing is coupled.

In addition, a cylindrical mounting sleeve 221 may be formed to be extended at the center of the sump cover 22. An insertion groove for inserting the mounting sleeve 221 may be formed on the bottom portion of the dish rack 14 so as to be recessed upward. A plurality of drain holes 223 (see FIG. 8) are formed in the sump cover 22 so that washing water supplied to the second wash space 122 through the washing water supply pipe 71 is collected into the sump housing 21. The structure of the sump cover 22 will be described once again with reference to the drawing.

On the other hand, a washing pump 23 is mounted on the center the bottom surface the sump cover 22. The washing pump 23 includes a pump housing 231 and an impeller 232 accommodated in the pump housing 231. A suction hole for sucking washing water is formed at the bottom portion of the pump housing 231.

In addition, a washing motor 24 is mounted on the outer bottom surface of the sump housing 21 and a motor shaft 241 of the washing motor 2 passes through the bottom portion 231 of the sump housing 21 and the suction hole formed in the bottom or the sump housing 21 and is connected to the impeller 232. Of course, a sealing member for preventing water leakage is provided at the bottom portion of the sump housing 21 through which the motor shaft 241 passes.

Therefore, when the motor shaft 241 of the washing motor 24 rotates, the impeller 232 rotates, and the washing water collected in the sump housing 21 sucked into the pump housing 231 through the suction hole. The washing water sucked into the washing pump 23 is supplied to the washing nozzle 147 through the mounting sleeve 221 and the nozzle holder 148.

In other words, a filter support sleeve 231a may be extended from the edge of the suction hole formed at the bottom of the pump housing 231 and a filter 25 may be mounted inside the filter support sleeve 231a. Therefore, before the washing water, which is collected in the sump housing 21, is sucked into the washing pump 23, the food waste contained in the washing water is caught by the filter 25. As a result, clogging of the injection holes 147a and 147b of the washing nozzle 147 by food waste can be prevented.

In addition, a disposer 26 in the form of a blade which crushes the food waste is disposed on the lower side of the filter 25 and a center portion of the disposer 26 is connected to the motor shaft 241. In other words, the disposer 26 rotates together with the motor shaft 241. According to this configuration, the food waste contained in the washing water sucked into the pump housing 231 is crushed by the disposer 26 and the crushed food waste is filtered by the filter 25. Therefore, food waste accumulates only in the sump housing 21 and is not injected into the dish rack 14 through the washing nozzle 147. In other words, food waste larger than the gap of the filter 25 is not introduced into the washing pump 23.

In addition, a heater 27 for heating the washing water to a high-temperature may be mounted on the sump housing 21, and the heater 27 may be a sieve heater. However, it is clear that there is no restriction on the type of the heater.

In other words, a drain port 211 is formed at a bottom edge portion of the sump housing 21 and a drain pump 28 and a drain motor 29 are mounted on the bottom of the sump housing 21 corresponding to the position of the drain port and the washing water, which is accumulated in the sump housing 21, can be discharged to the outside. An inlet end of the second drain pipe 128 may be connected to the drain pump 28.

According to the configuration described above, the washing water supplied from the washing water supply pipe 71 is collected in the sump housing 21, and when the washing water is filled up to the set water level in the sump housing 21, the washing water supply is stopped. The detergent is supplied through the detergent supply pipe 72 together with the washing water supply.

In this state, when the washing motor 24 is operated, the washing water is injected to the surface of the dishware accommodated in the dish rack 14 through the washing nozzle 147 at a high-pressure. Due to the structure of the injection hole formed in the washing nozzle 147, the washing nozzle 147 rotates by the high-pressure washing water injected through the injection hole without a separate power source. In other words, the washing nozzle rotates by the principle of action and reaction.

Then, the washing water injected through the washing nozzle 147 falls and returns to the sump housing 21. At this time, the drain 211 is kept a state of being closed. Therefore, the water supplied through the washing water supply pipe 71 in the washing process circulated between the sump housing 21 and the second washing space 122 until the washing process is completed. As a result, there an advantage that the consumption of washing water is remarkably reduced.

In other words, when the washing process is completed, the drain port 211 is opened and the drain pump 28 operates to supply the washing water containing the finely crushed food waste to the food processing unit 30 through the second drain pipe 128.

Then, the drain port 211 is closed again, clean water is supplied again through the washing water pipe 71, and the rinse is supplied through the detergent supply pipe 72. Then, the washing pump 23 is operated to circulate washing water, and the dishwashing process is performed again.

When the dishwashing process is completed, the washing water is drained and the clean washing water is supplied again through the washing water supply pipe 71. Then, a rinsing process may be performed in which the dishware is washed by the washing water without supplying the detergent.

When the rinsing process is completed, the drying process is performed in which the dishes are dried by the high-temperature dried air supplied by the drying fan 60. When the drying process is finished, the entire dishwashing process is completed.

Figure 8:
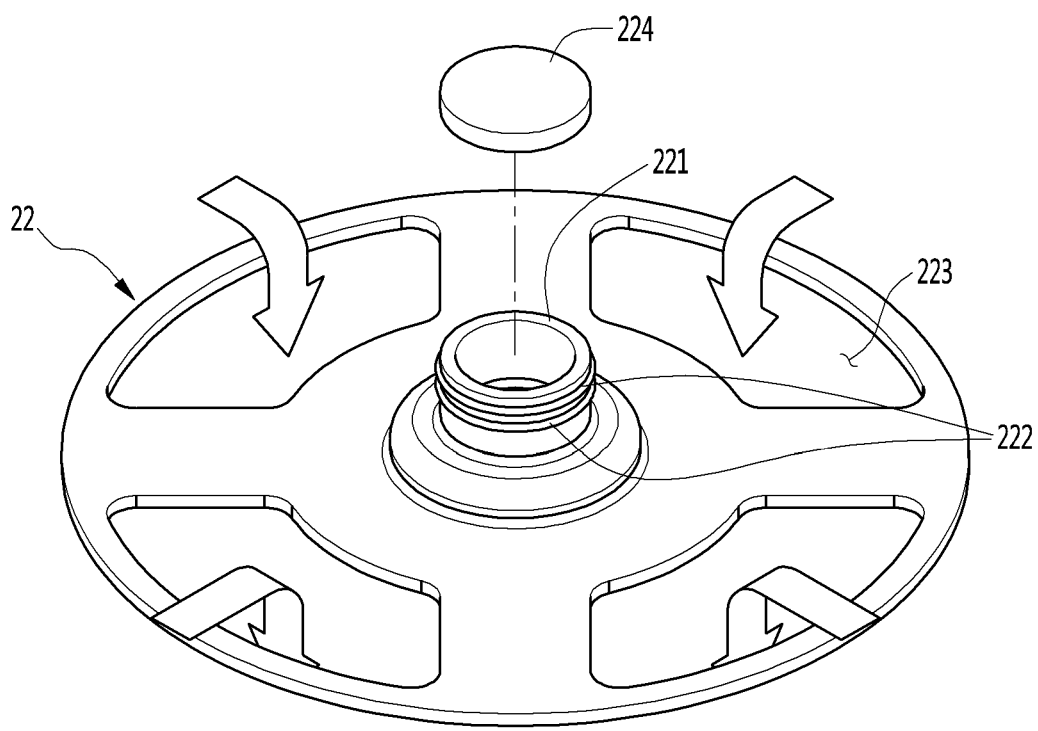
FIG. 8 is a perspective view of a sump cover constituting a sump assembly according to an embodiment of the present invention.

FIG. 8 is a perspective view of a sump cover constituting a sump assembly according to an embodiment of the present invention.

With reference to FIG. 8, the sump cover 22 may have a circular shape but is not limited thereto. The mounting sleeve 221 protrudes from a central portion of the sump cover 22 and the mounting sleeve 221 is shielded by the sleeve cover 224.

In other words, when the automatic dishwashing function is performed, the sleeve cover 224 is removed so that the mounting sleeve 221 is fitted into the recessed portion formed at the bottom center of the dish rack 14, as illustrated in FIG. 7.

The sealing member 222 is enclosed on the outer peripheral surface of the mounting sleeve 221 to prevent the washing water from leaking to the close contact portion of the mounting sleeve 221 and the recessed portion formed on the bottom of the dish rack 14.

In addition, a plurality of drain holes 223 are formed on the sump cover 22 so that the washing water supplied to the second washing space 122 and the washing water injected from the washing nozzle 147 are collected to the sump housing 21.

On the other hand, in a case where the automatic dishwashing mode is not performed, that is, in a state where the dish rack 14 is separated, the second washing space 122 can be also used as a general washing space like the first washing space 121. In this case, the drain port 211 may be kept in a state of being opened and the drain water may be naturally drained through the drain pump 28.

Figure 9:
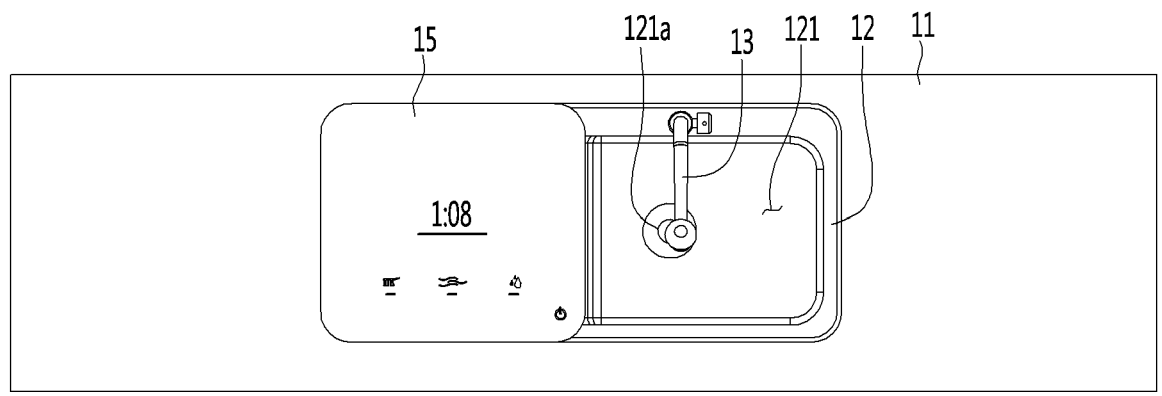
FIG. 9 is a plan view of the sink according to an embodiment of the present invention.

FIG. 9 is an view of a sink according to an embodiment of the present invention.

With reference to FIG. 9, the second washing space 122 is selectively shielded by the washing cover 15.

Specifically, the washing cover 15 can be slid into the inside of the table 11 as described above. When the washing cover 15 is drawn out and covers the upper surface of the second washing space 122, the washing cover 15 may operate as a control panel including a display unit.

More specifically, the washing cover 15 can be slid by the operation of a pull-out button formed on one side the table 11 or can be operated a pull-out button formed on the upper edge of the washing cover 15. This is as already described above.

In addition, in a state where the washing cover 15 is drawn out, the washing cover 15 may be divided into a display area and an operation unit area, and a touch button-type operation button may be formed in the operation unit area. For example, a power button, a dishwashing mode button, a button for inputting conditions for dishwashing, and the like may be provided. In other words, all the operation buttons provided in the control panel portion of the general dishwasher can be provided in a form of a touch button.

Various information such as the current time may be output in the form of an image, a character, or a moving image in the display area. If necessary, information which is useful to the user, for example, recipe information for a specific dish and cooking moving images can be displayed. In addition, the washing cover 15 may be provided with a wireless communication module such as a Wi-Fi or a Bluetooth to enable communication with a mobile device such as a mobile phone. In other words, the washing cover 15 can function as one communication equipment.

What is claimed is:
1. A sink comprising:
a washing case that defines a dishwashing space, the washing case defining at least one air hole at a rear surface of the washing case;
a table that receives the washing case;
a dish rack located in the dishwashing space and detachably coupled to the washing case;
a washing nozzle located at a lower portion of the dish rack and configured to rotate about a vertical axis;
a sump assembly that is located vertically below the dishwashing space, that is configured to store washing water, and that is configured to supply washing water to the washing nozzle in a state in which the dish rack is coupled to the washing case; and
a washing cover that is located at a position vertically above the dishwashing space and below the table, that is configured to slide in a first horizontal direction to cover at least a portion of the dishwashing space, and that is configured to slide in a second horizontal direction to be hidden under the table and expose at least the portion of the dishwashing space,
wherein the dish rack comprises a bottom portion facing a bottom surface of the washing case, a front portion facing a front surface of the washing case, a rear portion facing the rear surface of the washing case, a left side portion that connects the front portion to the rear portion, and a right side portion that connects the front portion to the rear portion, and
wherein at least one of the front portion or the rear portion of the dish rack defines a cut portion that is recessed downward from an upper end of the at least one of the front portion of the dish rack or the rear portion of the dish rack, the cut portion being configured to receive high-temperature dry air from the at least one air hole and supply the high-temperature dry air to the dish rack.

2. The sink according to claim 1, further comprising a plurality of guide wires that horizontally extend across the cut portion and that are vertically spaced apart from each other.

3. The sink according to claim 1, wherein the dish rack further comprises a flange that extends from an upper end of each of the left side portion and the right side portion.

4. The sink according to claim 3, wherein the dish rack defines an air slit at a corner portion between the left side portion and the flange or between the right side portion and the flange.

5. The sink according to claim 4, wherein the washing case comprises a division wall that divides the dishwashing space into a left side washing space and a right side washing space, and
wherein the air slit faces the division wall.

6. The sink according to claim 1, wherein the dish rack further comprises supporting wires that are disposed inside the dish rack and that are horizontally spaced apart from each other.

7. The sink according to claim 1, wherein the dish rack defines a plurality of drain holes at the bottom portion of the dish rack.

8. The sink according to claim 1, wherein the cut portion is defined at both of the front portion and the rear portion of the dish rack, and
wherein the dish rack further comprises a plurality of guide wires that horizontally extend across the cut portion and that are vertically spaced apart from each other.

9. The sink according to claim 1, wherein the dish rack further comprises a nozzle holder that protrudes upward from a center of the bottom portion of the dish rack, the vertical axis of the washing nozzle passing through the nozzle holder.

10. The sink according to claim 9, wherein the washing nozzle comprises a nozzle sleeve that is configured to couple to the nozzle holder and that extends from a center of a bottom surface of the washing nozzle toward the bottom portion of the dish rack.

11. The sink according to claim 1, further comprising a washing water supply pipe connected to the rear surface of the washing case and configured to supply washing water to the sump assembly.

12. The sink according to claim 11, further comprising at least one drain pipe that extends from the bottom portion of the washing case and that is configured to drain washing water in the washing case.

13. The sink according to claim 12, further comprising a food waste processing unit connected to an end of the at least one drain pipe.

14. The sink according to claim 11, further comprising:
a detergent supply pipe having a first end that is connected to a detergent supply hole defined in the rear surface of the washing case and that is configured to supply detergent to the dishwashing space; and
a detergent supply unit connected to a second end of the detergent supply pipe and configured to supply detergent to the detergent supply pipe.

15. The sink according to claim 11, wherein the sump assembly comprises:
a sump housing located vertically below the dishwashing space and configured to store washing water, the sump housing defining a sump space;
a sump cover that covers at least a portion of an upper surface of the sump housing;
a washing pump that is located vertically below the sump cover, that is located in the sump space, and that is configured to supply water to the washing nozzle;
a washing motor located at a bottom surface of the sump housing and configured to drive the washing pump;
a drain pump located at the bottom surface of the sump housing; and
a drain motor located at the bottom surface of the sump housing and configured to drive the drain pump.

16. A sink comprising:
a washing case that defines a dishwashing space that is open upward;
a table that receives the washing case;
a dish rack located in the dishwashing space and detachably coupled to the washing case;
a washing nozzle located at a lower portion of the dish rack and configured to rotate about a vertical axis;
a washing cover that is located at a position vertically above the dishwashing space, that is configured to slide in a first horizontal direction to cover at least a portion of the dishwashing space, and that is configured to slide in a second horizontal direction to be hidden under the table and expose at least the portion of the dishwashing space; and
a sump assembly that is located vertically below the dishwashing space, that is configured to store washing water, and that is configured to supply washing water to the washing nozzle in a state in which the dish rack is coupled to the washing case; and
wherein the sump assembly comprises:
a sump housing located vertically below the dishwashing space and configured to store washing water, the sump housing defining a sump space,
a sump cover that faces a bottom portion of the dish rack and that covers at least a portion of an upper surface of the sump housing, and
a washing pump that is located vertically below the sump cover, that is located in the sump space, and that is configured to supply water to the washing nozzle, and
wherein the dish rack comprises a nozzle holder that protrudes from a center of the bottom portion of the dish rack, that is configured to couple to the washing nozzle, and that is configured to supply washing water from the sump housing to the washing nozzle.

17. The sink according to claim 16, wherein the sump assembly further comprises:
a washing motor located at a bottom surface of the sump housing and configured to drive the washing pump;
a drain pump located at the bottom surface of the sump housing; and
a drain motor located at the bottom surface of the sump housing and configured to drive the drain pump.

18. The sink according to claim 17, further comprising:
a drain pipe connected to the drain pump and configured to discharge washing water from the sump housing; and
a food waste processor connected to the drain pipe and configured to receive food waste from washing water through the drain pipe.

19. The sink according to claim 16, wherein the dish rack defines a plurality of drain holes at the bottom portion of the dish rack.

20. The sink according to claim 19, wherein the sump cover defines a plurality of drain openings configured to receive wash water discharged through the plurality of drain holes of the dish rack.

* * * * *